United States Patent [19]

Watanabe et al.

[11] Patent Number: 4,731,300

[45] Date of Patent: Mar. 15, 1988

[54] PERPENDICULAR MAGNETIC RECORDING MEDIUM AND MANUFACTURING METHOD THEREOF

[75] Inventors: Noboru Watanabe; Yasuo Ishizaka; Kazuo Kimura, all of Yokohama; Eiichiro Imaoka, Sagamihara, all of Japan

[73] Assignee: Victor Company of Japan, Ltd., Japan

[21] Appl. No.: 834,236

[22] Filed: Feb. 26, 1986

[30] Foreign Application Priority Data

| | | | |
|---|---|---|---|
| Mar. 7, 1985 | [JP] | Japan | 60-45326 |
| Jun. 18, 1985 | [JP] | Japan | 60-132184 |
| Jun. 18, 1985 | [JP] | Japan | 60-132185 |
| Jun. 18, 1985 | [JP] | Japan | 60-132186 |
| Jun. 18, 1985 | [JP] | Japan | 60-132182 |
| Jun. 18, 1985 | [JP] | Japan | 60-132192 |
| Jun. 18, 1985 | [JP] | Japan | 60-132189 |
| Jun. 18, 1985 | [JP] | Japan | 60-132188 |
| Jun. 18, 1985 | [JP] | Japan | 60-132183 |

[51] Int. Cl.$^4$ .................... B32B 32/00

[52] U.S. Cl. .................... 428/636; 428/611; 428/668; 428/678; 428/928

[58] Field of Search .................... 428/611, 636, 668, 678, 428/928

[56] References Cited

U.S. PATENT DOCUMENTS 4,552,820 11/1985 Lin et al. .................... 428/611

OTHER PUBLICATIONS

"Initial Layer Effects in Co–Cr Films", by Edward R. Wuori and Professor J. H. Judy, IEEE Transactions on Magnetics, vol. MAG-20, No. 5, Sep. 1984, pp. 774–775.

"VSM Profiling of CoCr Films: A New Analytical Technique", by William G. Haines, IEEE Transactions on Magnetics, vol. MAG-20, No. 5, Sep. 1984, pp. 812–814.

Japanese Laid-Open Patent Application No. 58-169331.

*Primary Examiner*—John P. Sheehan

*Attorney, Agent, or Firm*—Andrus, Sceales, Starke & Sawall

[57] ABSTRACT

A perpendicular magnetic recording medium comprises a recording medium base, a low coercivity layer formed on the recording medium base and having a low coercivity in an in-plane direction thereof, and a high coercivity layer formed on the low coercivity layer and having a high coercivity in a direction perpendicular to a surface of the low coercivity layer. The low coercivity layer and the high coercivity layer are formed from the same magnetic material and constitute a magnetic layer. A method of manufacturing this perpendicular magnetic recording medium comprises a single magnetic layer forming process of successively and continuously forming the low coercivity layer and the high coercivity layer on the recording medium base by using the same magnetic material as a depositing material.

6 Claims, 35 Drawing Figures

PERPENDICULAR MAGNETIC RECORDING MEDIUM AND MANUFACTURING METHOD THEREOF

BACKGROUND OF THE INVENTION

The present invention generally relates to perpendicular magnetic recording mediums and manufacturing methods thereof, and more particularly to a perpendicular magnetic recording medium having satisfactory perpendicular magnetic recording and reproducing characteristics and a manufacturing method thereof.

Generally, when recording and reproducing a signal on and from a magnetic recording medium by use of a magnetic head, the magnetic head magnetizes a magnetic layer of the magnetic recording medium in a longitudinal direction of the magnetic recording medium (that is, in an in-plane direction) at the time of the recording and picks up the recording at the time of the reproduction. However, according to such a longitudinal magnetic recording system, it is known that the demagnetization field becomes high as the recording density increases and the demagnetization field introduces undesirable effects to the high density magnetic recording. Hence, in order to eliminate the undesirable effects of the demagnetization, a perpendicular magnetic recording system has been proposed in which the magnetic head magnetizes the magnetic layer of the magnetic recording medium in a direction perpendicular to the magnetic layer. According to the perpendicular magnetic recording system, the demagnetization field becomes low as the magnetic recording density increases, and theoretically, it is possible to realize a satisfactory high density magnetic recording in which there is no decrease in the remanent magnetization.

As a conventional perpendicular magnetic recording medium which is used in the perpendicular magnetic recording system, there is a perpendicular magnetic recording medium having a cobalt-chromium (Co-Cr) film formed on a base film by a sputtering process. As is well known, the Co-Cr film is extremely suited for use in the perpendicular magnetic recording medium because the Co-Cr film has a relatively high saturation magnetization (Ms) and favors magnetization in a direction perpendicular to the Co-Cr film (that is, the coercivity in the direction perpendicular to the Co-Cr film is large and the axis of easy magnetization is perpendicular to the Co-Cr film).

However, when perpendicular magnetic head performs the perpendicular magnetic recording and reproduction with respect to the perpendicular magnetic recording medium having the sputtered Co-Cr film, it is impossible to concentrate the magnetic flux at a predetermined magnetic recording position on the perpendicular magnetic recording medium, and there is a disadvantage in that it is impossible to obtain a strong magnetization which is in the direction perpendicular to the Co-Cr film and does not spread in the longitudinal direction of the perpendicular magnetic recording medium. In other words, when a ring core head is used to perform the recording on the Co-Cr film of the perpendicular magnetic recording medium, the magnetization direction easily deviates in the longitudinal direction of the perpendicular magnetic recording medium since the magnetic field generated by the ring core head includes considerable components in the in-plane direction. Accordingly, in order to maintain the magnetization direction in the perpendicular direction, the perpendicular magnetic recording medium must have a high perpendicular anisotropic magnetic field and have a saturation magnetization which is suppressed to a certain extent. However, the Co-Cr film does not have such characteristics, and there is a disadvantage in that it is impossible to perform a satisfactory perpendicular magnetic recording by the perpendicular magnetic head with the exception of the perpendicular magnetic head of the type having an auxiliary magnetic pole opposing a main magnetic pole. In addition, the coercivity in the perpendicular direction must be large in order to obtain a high reproduced output from the perpendicular magnetic recording medium having the Co-Cr film. On the other hand, it is desirable to make the thickness of the perpendicular magnetic recording medium large in order to decrease the demagnetization field, but the perpendicular magnetic recording medium will not make contact with the perpendicular magnetic head in a satisfactory state when the thickness of the perpendicular magnetic recording medium is large because the perpendicular magnetic recording medium will lose its flexibility and become rigid. In this case, there are disadvantages in that the rigid perpendicular magnetic recording medium is easily damaged and undesirable effects are introduced to the perpendicular magnetic head, and it is impossible to perform a satisfactory perpendicular magnetic recording and reproduction.

Accordingly, a perpendicular magnetic recording medium having a double film construction has been proposed. According to this perpendicular magnetic recording medium, a film having a high permeability, that is, a film having a low coercivity such as a nickel-ion (Ni-Fe) film, is formed between the Co-Cr film and the base film. The magnetic flux which is spread within the high permeability film is concentrated toward the magnetic pole of the perpendicular magnetic head at a predetermined magnetic recording position in order to obtain a strong magnetization which is in the perpendicular direction and does not spread in the longitudinal direction of the perpendicular magnetic recording medium. However, in the case of the perpendicular magnetic recording medium having the double film construction, the coercivity of the high permeability film is extremely small compared to the coercivity of the Co-Cr film, and there is a disadvantage in that Barkhausen noise is generated. For example, the coercivity of the Co-Cr film is over 700 Oe, and the coercivity of the high permeability film is under 10 Oe. Further, in order to produce the perpendicular magnetic recording medium having the double film construction, an amorphous (ion-nickel) Fe-Ni alloy or the like is formed on the base film by a sputtering process under a predetermined sputtering condition suited for forming the high permeability film, and Co-Cr is thereafter formed on the high permeability film by a sputtering process under a certain sputtering condition suited for forming the Co-Cr film. As a result, the sputtering condition under which the sputtering process is performed and the target must be changed for the formation of ech film, and the sputtering processes cannot be performed continuously. Therefore, there are disadvantages in that the processes of manufacturing the perpendicular magnetic recording medium are complex and unsuited for mass production.

SUMMARY OF THE INVENTION

Accordingly, it is a general object of the present invention to provide a novel and useful perpendicular magnetic recording medium and manufacturing method thereof in which the disadvantages described heretofore are eliminated, by noting the fact that when a magnetic material is coated on a base to form a magnetic layer the formed magnetic layer is constituted by two layers having different coercivities.

Another and more specific object of the present invention is to provide a perpendicular magnetic recording medium comprising a magnetic layer which is made from one magnetic material and is constituted by a layer having a low coercivity and a layer having a high coercivity on top of the layer having the low coercivity, where the layer having the low coercivity is used as a high permeability layer and the layer having the high coercivity is used as a perpendicular magnetization layer, and a method of manufacturing such a perpendicular magnetic recording medium. According to the perpendicular magnetic recording medium and manufacturing method thereof of the present invention, it is possible to obtain a high reproduced output from the perpendicular magnetic recording medium, and this characteristic is especially notable when the recording wavelength is small. In addition, it is possible to make the thickness of the perpendicular magnetic recording medium small, and the productivity of the perpendicular magnetic recording medium can be improved. Further, since the magnetic layer made from the one magnetic material is constituted by the two layers having different magnetic characteristics, an in-plane magnetization (M-H) hysteresis loop of the magnetic layer as a whole rises sharply and anomalously in a vicinity of an origin and the so-called magnetization jump occurs. Thus, the perpendicular magnetic recording and reproducing characteristics can be improved by using as the magnetic layer of the perpendicular magnetic recording medium the layer in which the magnetization jump occurs. In the present specification, a sudden change or steep inclination in the in-plane M-H hysteresis loop will be referred to as the magnetization jump, and a magnitude of the magnetization jump will be referred to as a magnetization jump quantity.

Other objects and further features of the present invention will be apparent from the following detailed description when read in conjunction with the accompanying drawings.

DETAILED DESCRIPTION

Figure 1:
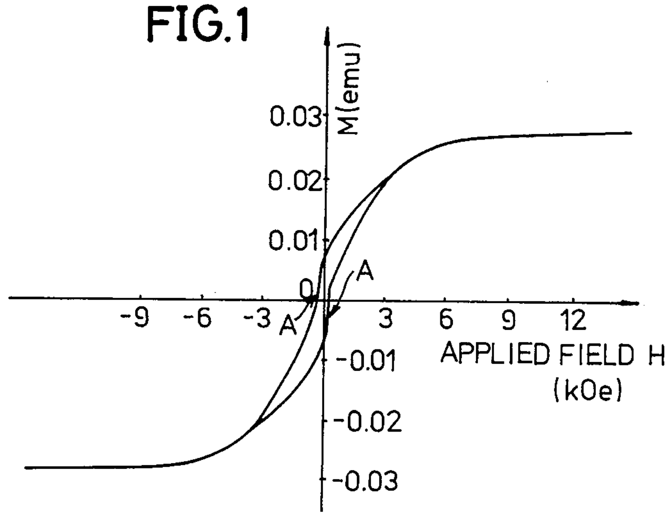
FIG. 1 shows an in-plane M-H hysteresis loop for the case where a magnetic layer of an embodiment of the perpendicular magnetic recording medium according to the present invention is constituted by a cobalt-chromium-niobium (Co-Cr-Nb) thin film having a thickness of 0.2 micron and a magnetic field of 15 kOe is applied thereto.

The perpendicular magnetic recording medium (hereinafter simply referred to as a recording medium) is made by sputtering on a substrate or a tape which becomes a base a magnetic material which is used as a target. For example, the substrate or tape is made of a polyimide resin or the like, and the magnetic material contains cobalt (Co), chromium (Cr) and at least one of niobium (Nb) and tantalum (Ta).

When a metal or the like such as an Co-Cr alloy is sputtered on the base, it is known that the sputtered film does not have the same crystal structure in a direction perpendicular to the film surface. It is known from various experiments and from scanning electron microscope (SEM) pictures that a first crystal layer of fine grain is formed in a vicinity of the base for an extremely small thickness, and a second crystal layer of coarse gain is formed on the first crystal layer. For example, the fact that the crystal layer at the bottom portion of the sputtered film does not have a well defined columnar structure while the second crystal layer formed on the first crystal layer has a well defined columnar structure, is disclosed by Edward R. Wuori and Professor J. H. Judy, "Initial Layer effects in Co-Cr films", IEEE TRANSACTIONS ON MAGNETICS, Vol. MAG-20, No. 5, September 1984, pp. 774–775, and by William G. Haines, "VSM Profiling of CoCr Films: A New Analytical Technique", IEEE TRANSACTIONS ON MAGNETICS, Vol. MAG-20, No. 5, September 1984, pp. 812–814.

The present inventors noted on the above points, and sputtered on various metals which have a Co-Cr alloy as the base and are respectively added with a third element. Then, physical characteristics of the first crystal layer of fine grain formed on the bottom portion of the sputtered metal film and the second crystal layer of coarse grain formed on the first crystal layer were measured for each of the various sputtered metal films. As a result, it was found that when Nb or Ta is added to the metal as the third element, the perpendicular coercivity of the first crystal layer is extremely small compared to the perpendicular coercivity of the second crystal layer. The present invention is characterized in that this first crystal layer having the small perpendicular coercivity is used as a high permeability layer and the second crystal layer having the large perpendicular coercivity is used as a perpendicular magnetization layer of the recording medium.

Description will now be given with respect to the experimental results which were obtained by measuring the coercivities of the first and second crystal layers formed on the base by the sputtering. A Co-Cr-Nb thin film or a Co-Cr-Ta thin film is formed on the base by a sputtering process performed under the following conditions.

(1) Sputtering apparatus:
RF magnetron sputtering apparatus.
(2) Sputtering method:
Continuous sputtering, at an initial discharge pressure of $1\times10^{-6}$ Torr and introducing argon (Ar) gas until the pressure reaches $1\times10^{-3}$ Torr.
(3) Base:
A polyimide resin having a thickness of 20 microns.
(4) Target:
A composite target obtained by placing small pieces of Nb or Ta on the Co-Cr alloy.
(5) Distance between target and base:
110 mm.

The magnetic characteristic of the thin films was measured by a vibrating sample magnetometer manufactured by Riken Denshi of Japan, the composition of the thin films was measured by an energy dispersion type microanalyzer manufactured by KEVEX of the United States and the crystal orientation of the thin films was measured by an X-ray analyzer manufactured by Rigaku Denki of Japan.

FIG. 1 shows an in-plane M-H hysteresis loop for the case where a magnetic field of 15 kOe is applied to a recording medium which is obtained by adding Nb to Co-Cr as the third element (the same phenomenon occurs when the Nb is added in a range of 2 to 10 at%) and sputtering the Co-Cr-Nb on the polyimide resin base with a film thickness of 0.2 micron. As shown in FIG. 1, the in-plane M-H hysteresis loop rises sharply and anomalously in a vicinity of an origin as indicated by an arrow A and the so-called magnetization jump (hereinafter simply referred to as a jump) occurs. When it is assumed that a uniform crystal growth constantly occurs when the Co-Cr-Nb is sputtered on the base to form the Co-Cr-Nb thin film, the jump shown in FIG. 1 would not occur, and it can therefore be conjectured that a plurality of crystal layers having different magnetic characteristics coexist within the Co-Cr-Nb thin film.

Figure 2:
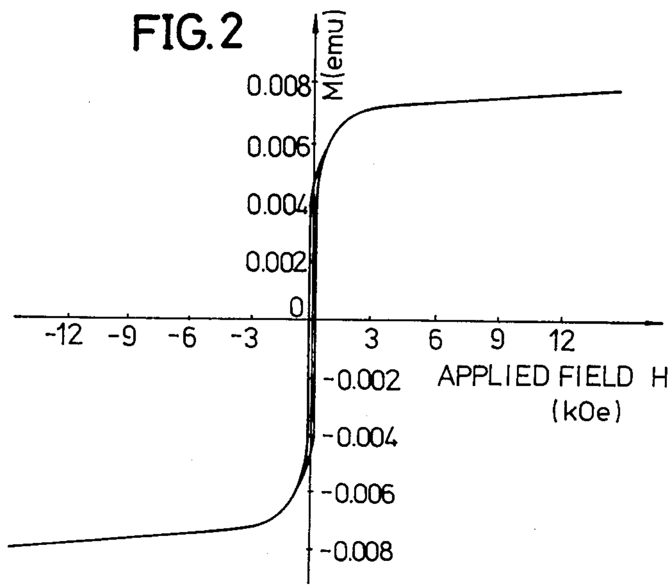
FIG. 2 shows an in-plane M-H hysteresis loop for the case where the magnetic layer of the embodiment of the perpendicular magnetic recording medium according to the present invention is constituted by a Co-Cr-Nb thin film having a thickness of 0.05 micron and a magnetic field of 15 kOe is applied thereto.

FIG. 2 shows an in-plane M-H hysteresis loop for the case where a magnetic field of 15 kOe is applied to a recording medium which is obtained by sputtering the Co-Cr-Nb on the polyimide resin base with a film thickness of 0.05 micron under the same sputtering condition. Unlike the case shown in FIG. 1, there is no jump in the in-plane M-H hysteresis loop shown in FIG. 2, and it can be seen that the Co-Cr-Nb thin film having a film thickness in the order of 0.05 micron is constituted by a substantially uniform crystal layer. In addition, it can be seen from FIG. 2 that an in-plane coercivity Hc(//) (hereinafter simply referred to as a coercivity Hc(//)) for the case where the film thickness is in the order of 0.05 micron is extremely small and the in-plane permeability is therefore extremely high. From these results, the coercivity Hc(//) of an initial layer which initially grows in the vicinity of the base by the sputtering is small, and this initial layer can be regarded as the first crystal layer of fine grain (hereinafter simply referred to as the first crystal layer) which has been confirmed by the SEM pictures as described before. A layer which grows on the initial layer has a coercivity Hc(//) which is larger than the coercivity Hc(//) of the initial layer, and this layer can be regarded as the second crystal layer of coarse grain (hereinafter simply referred to as the second crystal layer) which has also been confirmed by the SEM pictures.

Figure 3:
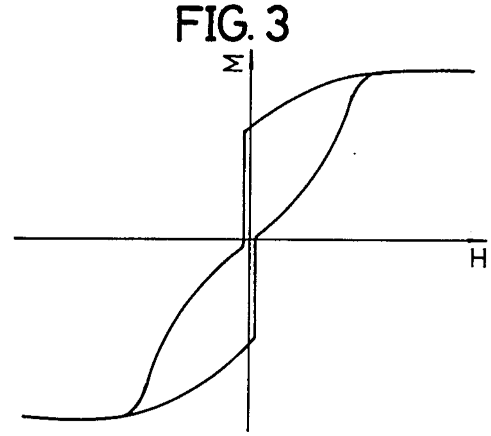
FIGS. 3 through 5 respectively show in-plane M-H hysteresis loops for explaining the reason why a magnetization jump occurs.
Figure 4:
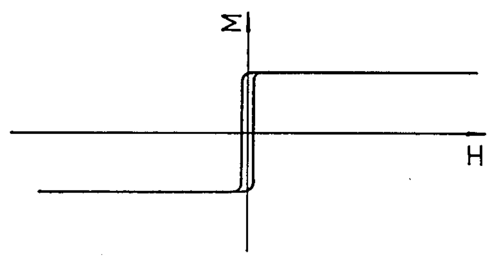
Figure 5:
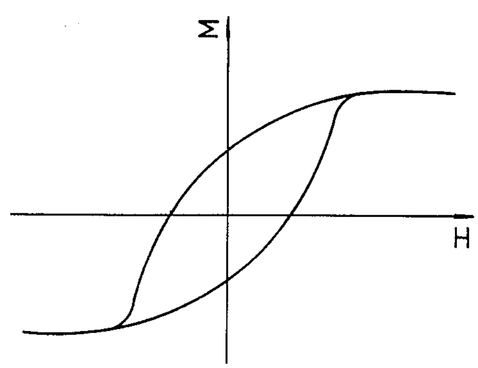

The reason why the jump occurs in the Co-Cr-Nb thin film in which the first and second crystal layers coexist will now be described in conjunction with FIGS. 3 through 5. It should be noted that the jump does not occur for all Co-Cr-Nb thin films with different compositions and sputtering conditions, as will be described later on in the specification. When the Co-Cr-Nb thin film is formed under a predetermined sputtering condition and the in-plane M-H hysteresis loop is obtained for this thin film by measurement, the obtained in-plane M-H hysteresis loop rises sharply in a vicinity of an origin as shown in FIG. 3 and the jump occurs. An in-plane M-H hysteresis loop shown in FIG. 4 for a thin film solely consisting of the first crystal layer can be obtained by measurement by forming a thin film which has a small film thickness. The second crystal layer can be regarded as having a uniform crystal structure, and further, the in-plane M-H hysteresis loop shown in FIG. 3 can be regarded as a composition of the in-plane M-H hysteresis loop of the first crystal layer and an in-plane M-H hysteresis loop of the second crystal layer. Hence, the in-plane M-H hysteresis loop of the second crystal layer can be regarded as a smooth hysteresis loop shown in FIG. 5 in which the coercivity Hc(//) is larger than that of the first crystal layer and no jump occurs. In other words, the existence of the jump in FIG. 3 indicates that two layers having different magnetic characteristics coexist in the same thin film. For this reason, it can be understood that two layers having different magnetic characteristics also coexist in the Co-Cr-Nb thin film having the in-plane M-H hysteresis loop shown in FIG. 1. The coercivity of the second crystal layer can be obtained from a hysteresis loop which is obtained by subtracting the in-plane M-H hysteresis loop of the Co-Cr-Nb thin film which solely consists of the first crystal layer from the in-plane M-H hysteresis loop of the Co-Cr-Nb thin film in which the first and second crystal layers coexist. From the experimental results, it is proved that two layers having different magnetic characteristics coexist in the Co-Cr-Nb thin film when the in-plane M-H hysteresis loop of the Co-Cr-Nb thin film has a sharp rise in the vicinity of the origin and the jump occurs.

Figure 6:
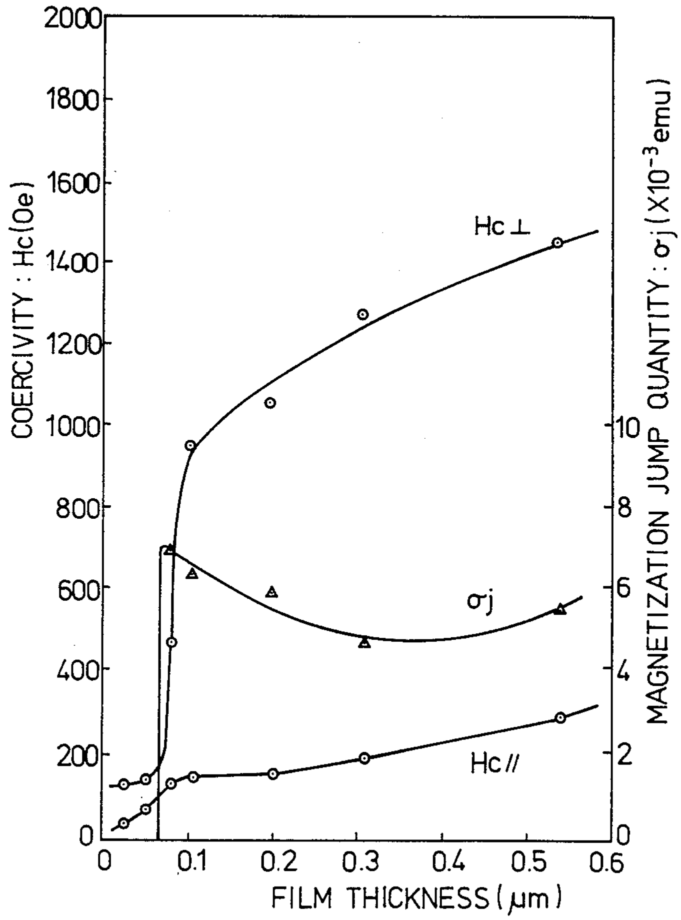
FIG. 6 is a graph showing an in-plane coercivity Hc(//), a perpendicular coercivity Hc(⊥) and a magnetization jump quantity $\sigma_j$ for each film thickness when the film thickness of the Co-Cr-Nb thin film is controlled by varying the sputtering time.

Next, description will be given with respect to the magnetic characteristics of the two layers constituting the Co-Cr-Nb thin film which is sputtered on the base in relation to the film thickness of the Co-Cr-Nb thin film, by referring to FIG. 6. FIG. 6 is a graph showing the coercivity Hc(//), a perpendicular coercivity Hc(⊥) (hereinafter simply referred to as a coercivity Hc(⊥)) and a magnetization jump quantity (hereinafter simply referred to as a jump quantity) $\sigma_j$ for each film thickness when the film thickness of the Co-Cr-Nb thin film is controlled by varying the sputtering time.

Giving attention to the coercivity Hc(//), the coercivity Hc(//) is under 180 Oe and is extremely small when the film thickness is under 0.15 micron, and the in-plane permeability can be regarded as being high. In addition, the coercivity Hc(//) does not change greatly even when the film thickness increases. On the other hand, giving attention to the jump quantity $\sigma_j$, the jump quantity $\sigma_j$ rises sharply at the film thickness of approximately 0.075 micron and describes an upwardly-opening parabola for the thickness of over 0.075 micron. Further, giving attention to the coercivity Hc(⊥), the coercivity Hc(⊥) rises sharply from approximately 180 Oe at the film thickness of 0.05 to 0.15 micron and is over 900 Oe for the film thickness of over 0.15 micron. From these results, it can be seen that a boundary between the first and second crystal layers exist at the film thickness of approximately 0.05 to 0.15 micron. In other words, the coercivities Hc(//) and Hc(⊥) of the first crystal layer at the film thickness of under 0.05 micron are both under 180 Oe and small, while the coercivity Hc(//) of the second crystal layer at the film thickness of over 0.15 micron is under approximately 180 Oe and small and the coercivity Hc(⊥) of this second crystal layer is over 900 Oe and large. The second crystal layer is thus a high coercivity layer suited for the perpendicular magnetic recording and reproduction. At such a film thickness that the jump does not occur, the coercivities Hc(//) and Hc(⊥) are both under 180 Oe and small. But at such a large film thickness that the jump occurs, the coercivity Hc(⊥) sharply increases. It is hence also seen from this point of view that the Co-Cr-Nb thin film is constituted by two layers having different magnetic characteristics when the jump occurs. According to the experiments performed by the present inventors, when the composition and/or the sputtering condition is slightly changed, there is a slight change in the film thickness at which the jump quantity $\sigma_j$ and the coercivity Hc(⊥) respectively rise sharply, and the slight change in the film thickness occurs within the range of 0.05 to 0.15 micron. That is, it can be regarded that the jump occurs when the first crystal layer has a thickness in the range of 0.05 to 0.15 micron.

Figure 7:
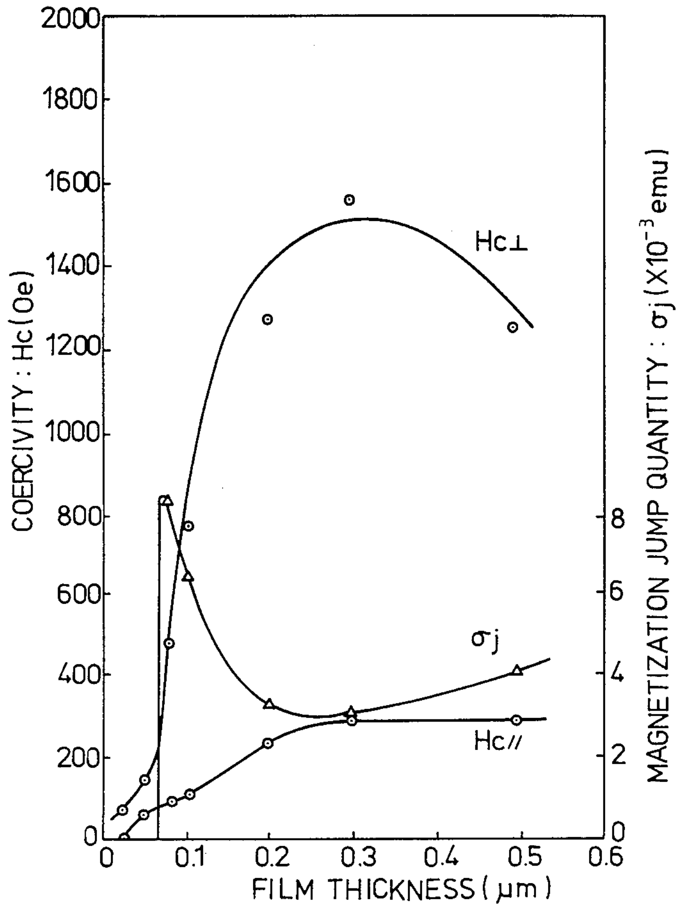
FIG. 7 is a graph showing an in-plane coercivity Hc(//), a perpendicular coercivity Hc(⊥) and a magnetization jump quantity $\sigma_j$ for each film thickness when the film thickness of a cobalt-chromium-tantalum (Co-Cr-Ta) thin film is controlled by varying the sputtering time.

Next, the results shown in FIG. 7 are obtained when similar experiments are performed by adding Ta to Co-Cr as the third element (the same phenomenon occurs when the Ta is added in a range of 2 to 10 at%) and sputtering the Co-Cr-Ta on the polyimide resin base with various film thicknesses. FIG. 7 is a graph showing the coercivity Hc(//), the perpendicular coercivity Hc(⊥) and the jump quantity $\sigma_j$ for each film thickness when the film thickness of the Co-Cr-Ta thin film is controlled by varying the sputtering time. The results obtained by adding the Ta to the Co-Cr are similar to the case where the Nb is added to the Co-Cr. As shown in FIG. 7, the boundary between the first and second crystal layers exists at the film thickness of 0.05 to 0.15 micron. At the film thickness of under 0.05 micron, that is, in the first crystal layer, the coercivities Hc(//) and Hc(⊥) are both under 170 Oe and small, and a low coercivity layer exists at the film thickness of under 0.05 micron. On the other hand, at the film thickness of over 0.075 micron, that is, in the second crystal layer, the coercivity Hc(//) is small but the coercivity Hc(⊥) rises from 200 Oe to over 750 Oe in the range of the film thickness in which the jump occurs and thereafter gradually increases as the film thickness increases. In other words, a high coercivity layer exists at the film thickness of over 0.075 micron.

Figure 8A:
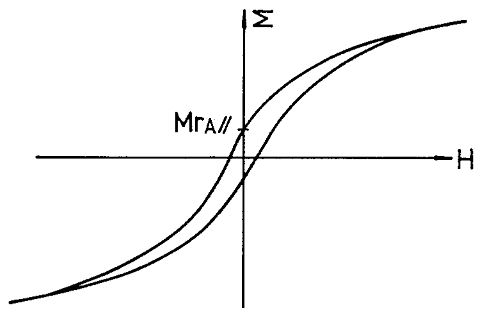
FIGS. 8A through 8C are graphs respectively showing an in-plane M-H hysteresis loop of the Co-Cr-Nb thin film in which no magnetization jump occurs.
Figure 8B:
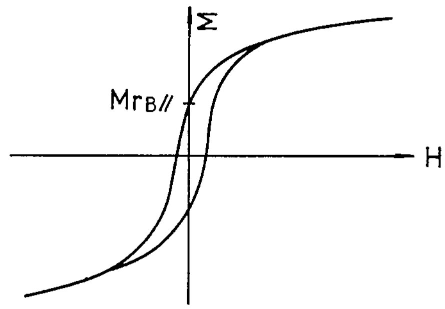
Figure 8C:
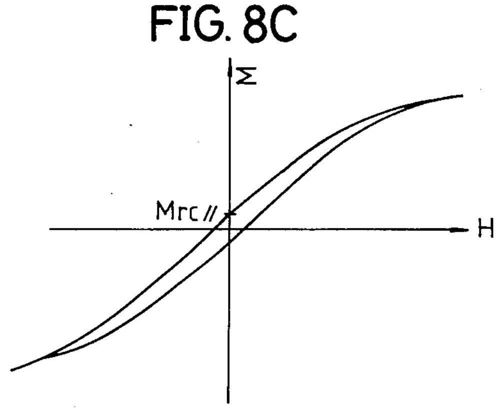

It should be noted from the experiments described above that the jump does not occur when the sputtering condition and the adding quantity of the Nb or Ta (2 to 10 at% in the case of the Nb and 1 to 10 at% in the case of the Ta) are changed from those described before, however, the first and second crystal layers are also formed within the Co-Cr-Nb thin film and the Co-Cr-Ta thin film in which no jump occurs (refer to the references cited on page 9). An example of the in-plane M-H hysteresis loop of the Co-Cr-Nb thin film in which no jump occurs will be described by referring to FIGS. 8A through 8C. FIG. 8A shows the in-plane M-H hysteresis loop for both the first and second crystal layers, FIG. 8B shows the in-plane M-H hysteresis loop solely for the first crystal layer and FIG. 8C shows the in-plane M-H hysteresis loop solely for the second crystal layer. It is seen from FIGS. 8A through 8C that the in-plane remanent magnetization $Mr_B$(//) of the first crystal layer is larger than the in-plane remanent magnetization $Mr_C$ of the second crystal layer. Further, the in-plane remanent magnetization $Mr_A$(//) of both the first and second crystal layers is unfavorable compared to the in-plane remanent magnetization $Mr_C$(//) of the second crystal layer, and the anisotropic magnetic field Mk is small. In addition, it is known that the orientation of the first crystal layer is poor (the $\Delta\theta_{50}$ is large) and the first crystal layer is unsuited for the perpendicular magnetic recording.

Figure 9:
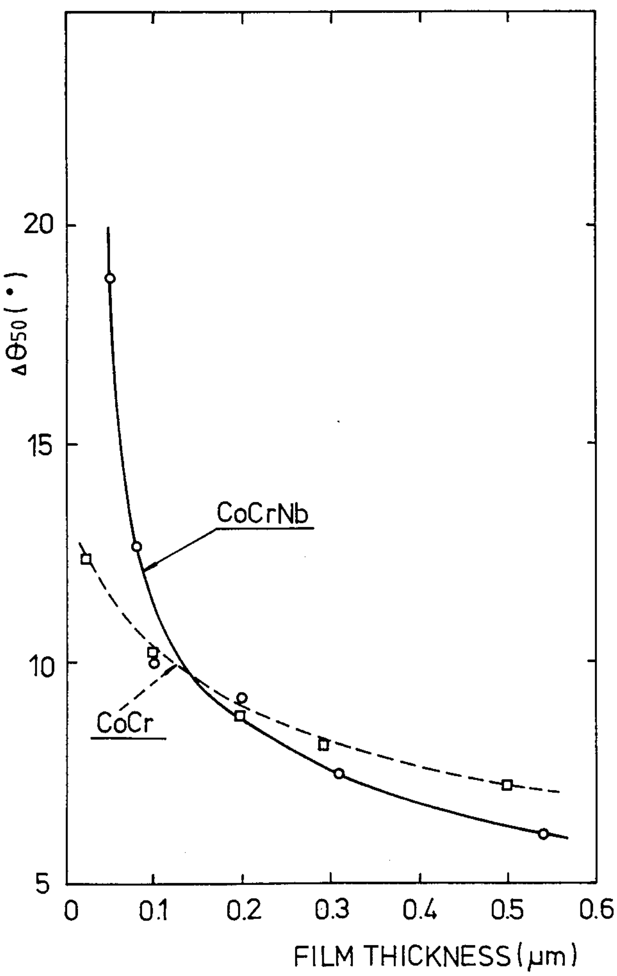
FIG. 9 is a graph showing the relationships of the rocking curve half-value ($\Delta\theta_{50}$) of the hcp (002) plane of each of a cobalt-chromium (Co-Cr) thin film and the Co-Cr-Nb thin film with respect to the film thickness.

FIG. 9 is a graph showing the relationships of the rocking curve half-value ($\Delta\theta_{50}$) of the hcp (002) plane of each of a cobalt-chromium (Co-Cr) thin film (composition of $Co_{81}Cr_{19}$ at%) and the Co-Cr-Nb thin film with respect to the film thickness. The Co-Cr thin film is formed under the same sputtering conditions as those described before except for the condition (4), and the Co-Cr alloy alone is used as the target in this case. It is seen from FIG. 9 that the orientation of the Co-Cr-Nb thin film is extremely poor in the initial stage of the film formation while the orientation of the Co-Cr thin film is satisfactory in the initial stage of the film formation. However, the orientation of the Co-Cr-Nb thin film improves rapidly as the film thickness of the thin film increases. The orientation of the Co-Cr-Nb thin film is more satisfactory than that of the Co-Cr thin film when the film thickness of the Co-Cr-Nb thin film is over approximately 0.15 micron. In other words, the orientation of the Co-Cr-Nb thin film is poor in the initial stage of the film formation, that is, during the formation of the first crystal layer, but the orientation of the Co-Cr-Nb thin film rapidly improves when the film thickness becomes over approximately 0.15 micron, that is, when the second crystal layer is formed. Hence, it can be understood that in the case of the Co-Cr-Nb thin film, two layers having different magnetic characteristics are formed depending on the film thickness, and the orientation of the second crystal layer is more satisfactory than that of the Co-Cr thin film.

Figure 10A:
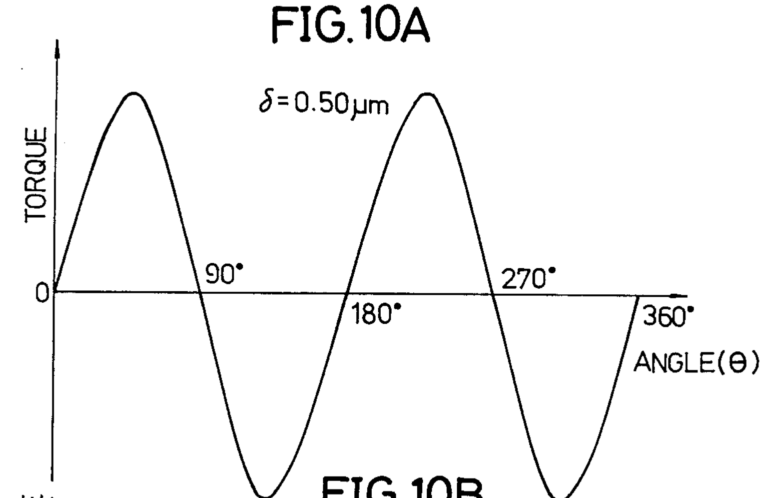
FIGS. 10A through 10C are graphs respectively showing torque curves of the Co-Cr thin films respectively having film thicknesses of 0.50, 0.20 and 0.05 micron.
Figure 10B:
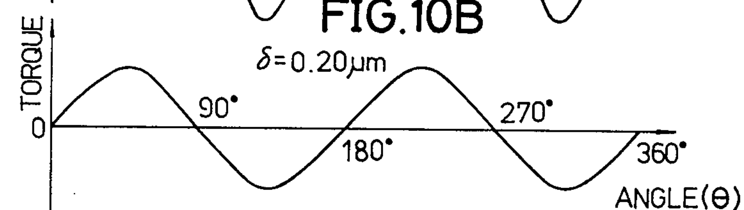
Figure 10C:
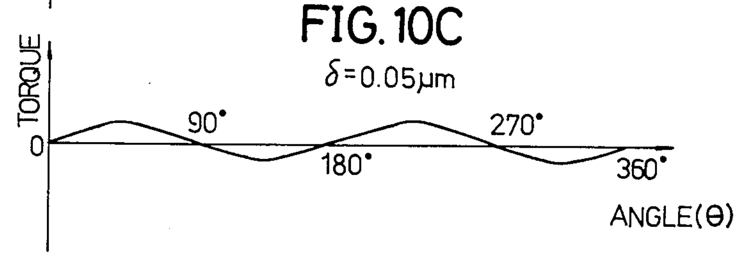
Figure 11A:
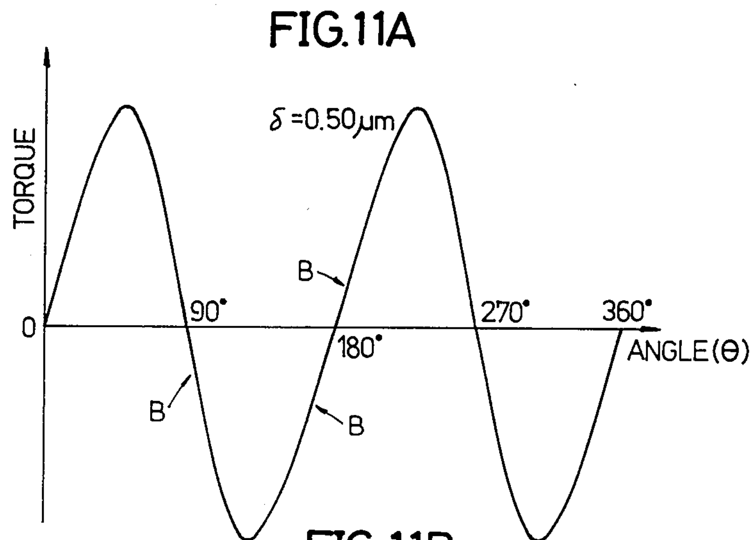
FIGS. 11A through 11C are graphs respectively showing torque curves of the Co-Cr-Nb thin films respectively having film thicknesses of 0.50, 0.18 and 0.05 micron.
Figure 11B:
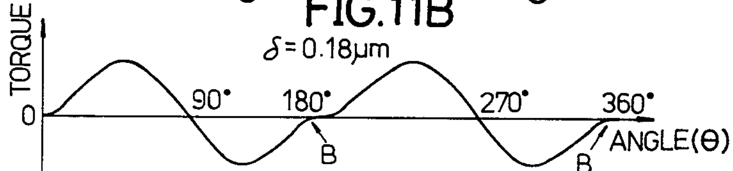
Figure 11C:
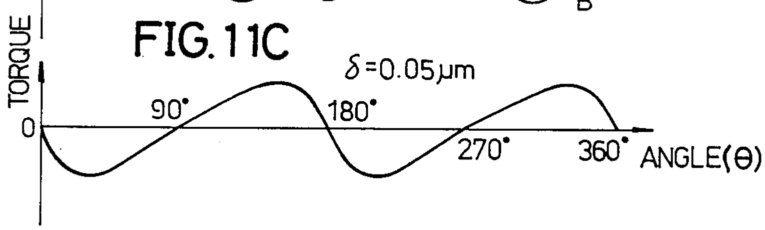

Next, the Co-Cr-Nb thin film will be examined from the point of view of the magnetic anisotropy. FIGS. 10A through 10C are graphs respectively showing torque curves of the Co-Cr thin films respectively having film thicknesses of 0.50, 0.20 and 0.05 micron, and FIGS. 11A through 11C are graphs respectively showing torque curves of the Co-Cr-Nb thin films respectively having film thicknesses of 0.50, 0.18 and 0.05 micron. In each of these graphs, the abscissa ($\theta$) represents the angle formed between the normal to the film surface and the applied magnetic field, the ordinate represents the torque, and the applied magnetic field to the thin film is 10 kOe. Moreover, the Co-Cr thin films and the Co-Cr-Nb thin films respectively have the composition of $Co_{81}Cr_{19}$ at% and $Co_{77.9}Cr_{16.0}Nb_{6.1}$ at% and the saturation magnetization Ms of 400 emu/cc and 350 emu/cc.

In the case of the Co-Cr thin films shown in FIGS. 10A through 10C, the polarity of the torque curve is the same for the three thin films and the axis of easy magnetization is perpendicular to the film surface. In the case of the Co-Cr-Nb thin films shown in FIGS. 11A and 11B respectively having the film thicknesses of 0.50 and 0.18 micron, the polarity of the torque curve is the same for the two thin films and the axis of easy magnetization is perpendicular to the film surface. However, in the case of the Co-Cr-Nb thin film shown in FIG. 11C having the film thickness of 0.05 micron, the polarity of the torque curve is opposite to that of the torque curves of the other thin films and the axis of easy magnetization is in-plane of the thin film. As described before, it can be regarded that only the first crystal layer is formed in the case of the Co-Cr-Nb thin film having the film thickness of 0.05 micron, and the axis of easy magnetization of the first crystal layer is in-plane of the first crystal layer. As the film thickness increases, the axis of easy magnetization becomes perpendicular to the film surface, and it can be regarded that the second crystal layer has a strong axis of easy magnetization which is perpendicular to the film surface. Further, it should be noted that in the torque curves of the Co-Cr-Nb thin films having the film thicknesses of over 0.05 micron, there are anomalous parts indicated by arrows B in FIGS. 11A and 11B. It can be regarded that the anomalous part in the torque curve is introduced due to the magnetic characteristic of the first crystal layer. In other words, when the film thickness of the thin film becomes larger than a predetermined value, the second crystal layer which has an axis of easy magnetization perpendicular to the film surface is formed on the first crystal layer which has an axis of easy magnetization in-plane of the first crystal layer. It can be conjectured that the first and second crystal layers having the different magnetic characteristics affect each other and the anomalous part is introduced in the torque curve of the thin film as a whole. It is hence also proved from the torque curves that two layers having different magnetic characteristics coexist in the single Co-Cr-Nb thin film.

When the Co-Cr-Nb or Co-Cr-Ta thin film constituted by the first and second crystal layers is used as the magnetic layer of the perpendicular magnetic recording medium and an attempt is made to magnetize the entire thin film in the direction perpendicular to the film surface according to the conventional concept, the existence of the first crystal layer is an extremely unfavorable primary factor to the perpendicular magnetization. The existence of the first crystal layer is an unfavorable primary factor for both cases where the jump does and does not occur. In other words, in the case where the jump occurs, the coercivities Hc(//) and Hc(⊥) of the first crystal layer is extremely small and it can be regarded that there is virtually no perpendicular magnetization in the first crystal layer. On the other hand, in the case where the jump does not occur, the coercivity Hc(//) of the first crystal layer is larger than that of the case where the jump occurs, but the coercivity Hc(⊥) of the first crystal layer is insufficient for realizing the perpendicular magnetic recording, and it can be regarded that it is impossible to perform a satisfactory perpendicular magnetic recording. Accordingly, even when the magnetization is performed in the direction perpendicular to the film surface, there is virtually no perpendicular magnetization in the first crystal layer, and the efficiency of the perpendicular magnetization of the thin film as a whole is deteriorated. Such a deterioration in the efficiency of the perpendicular magnetization is especially notable in the case of a magnetic head such as the ring core head which generates a magnetic field including considerable components in the in-plane direction. In addition, giving attention to the film thickness, the thickness of the first crystal layer is under 0.15 micron and is approximately constant regardless of the film thickness of the thin film as a whole. Hence, when the film thickness of the thin film is reduced in order not to lose the flexibility of the recording medium, the relative thickness of the first crystal layer increases with respect to the film thickness of the thin film as a whole, and the perpendicular magnetization characteristic is further deteriorated.

However, the present inventors found that the first crystal layer has such a magnetic characteristic that the coercivity Hc(//) is small and the permeability is relatively high, and magnetic characteristic of the first crystal layer is similar to that of the high permeability layer (for example, an Fe-Ni thin film) which is provided between the base and the Co-Cr thin film of the conventional recording medium. Hence, the first crystal layer having the small coercivity Hc(//) may be used as the high permeability layer and the second crystal layer having the large coercivity Hc(⊥) may be used as the perpendicular magnetization layer, and the recording medium comprising the single thin film constituted by the first and second crystal layers can be regarded as having the same functions as the conventional perpendicular magnetic recording medium having the double film construction.

Description will now be given with respect to the change in the magnetic characteristic and the difference in the reproduced output when the composition and thickness of the Co-Cr-Nb thin film and the Co-Cr-Ta thin film are changed, by referring to Tables 1 through 3 and FIGS. 12A through 17. Table 1 shows various magnetic characteristics for the cases where the composition and the film thickness of the Co-Cr thin film and the Co-Cr-Nb thin film are varied. FIGS. 12A through 12E are graphs respectively showing the in-plane M-H hysteresis loops of the thin films shown in Table 1. In Table 1, $\delta$ represents the film thickness, Ms represents the saturation magnetization, Hc(⊥) represents the perpendicular magnetization, Hc(//) represents the in-plane magnetization, Mr(//)/Ms represents the in-plane squareness ratio, Mr(//) represents the in-plane remanent magnetization of the thin film and Hk represents the perpendicular anisotropic magnetic field.

TABLE 1

| Composition (at %) | $\delta$ (μm) | Ms (emu/cc) | Hc(⊥) (Oe) | Hc(//) (Oe) | $\Delta\theta 50$ (deg) | Mr(//)/Ms | Hk (Oe) |
|---|---|---|---|---|---|---|---|
| $Co_{84.1}Cr_{13.2}Nb_{2.7}$ | 0.19 | 448 | 893 | 177 | 8.7 | 0.24 | 3030 |
| $Co_{85.3}Cr_{13.4}Nb_{1.3}$ | 0.19 | 497 | 677 | 435 | 8.9 | 0.21 | 3900 |
| $Co_{81}Cr_{19}$ | 0.20 | 449 | 728 | 446 | 10.1 | 0.19 | 4350 |
| $Co_{84.1}Cr_{13.2}Nb_{2.7}$ | 0.105 | 449 | 949 | 150 | 11.5 | 0.43 | 1320 |
| $Co_{81}Cr_{19}$ | 0.10 | 395 | 753 | 423 | 10.2 | 0.24 | 3420 |

Figure 12A:
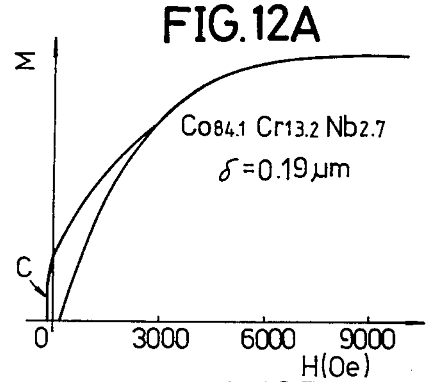
FIGS. 12A through 12E are graphs respectively showing in-plane M-H hysteresis loops of the thin films shown in Table 1.
Figure 12B:
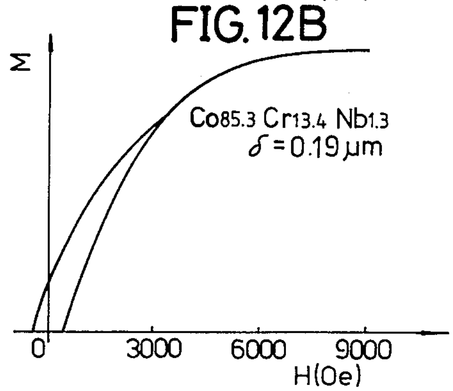
Figure 12C:
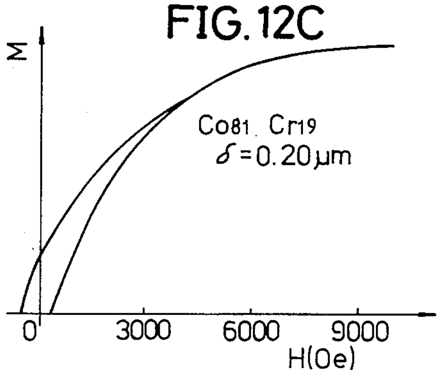
Figure 12D:
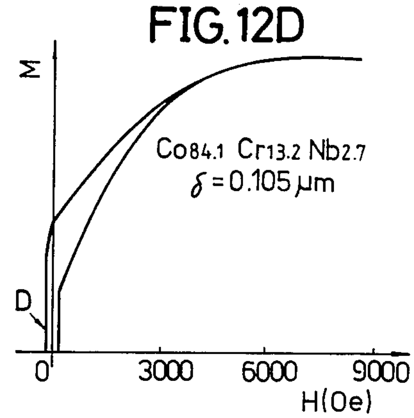
Figure 12E:
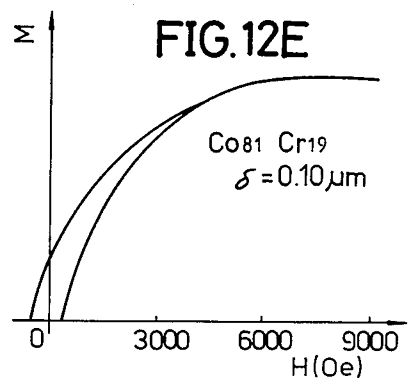
Figure 13:
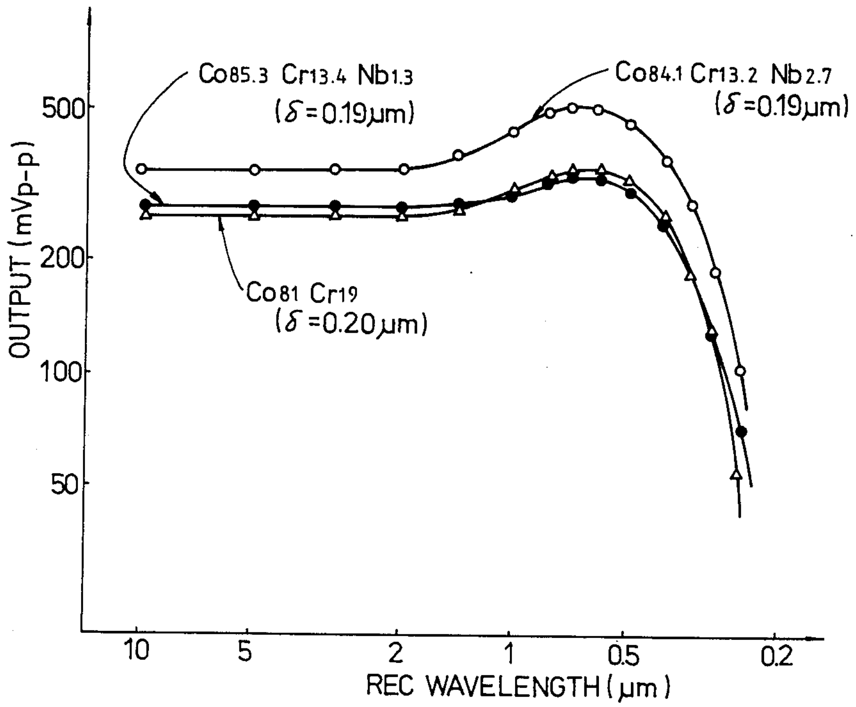
FIG. 13 is a graph showing the relationship between the recording wavelength and the reproduced output when the perpendicular magnetic recording and reproduction are performed with respect to the Co-Cr-Nb thin films and the Co-Cr thin films.
Figure 14A:
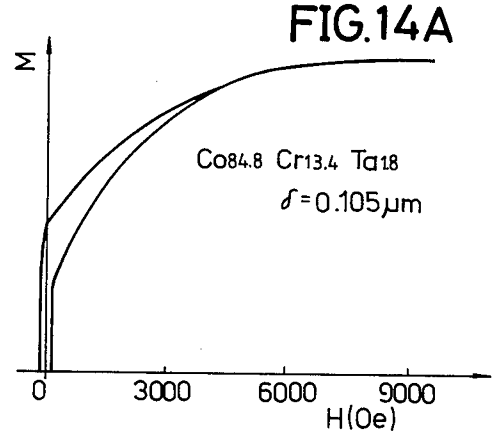
FIGS. 14A through 14C are graphs respectively showing in-plane M-H hysteresis loops of the thin films shown in Table 2.
Figure 14B:
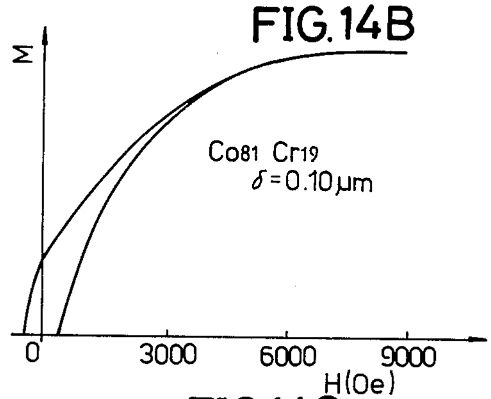
Figure 14C:
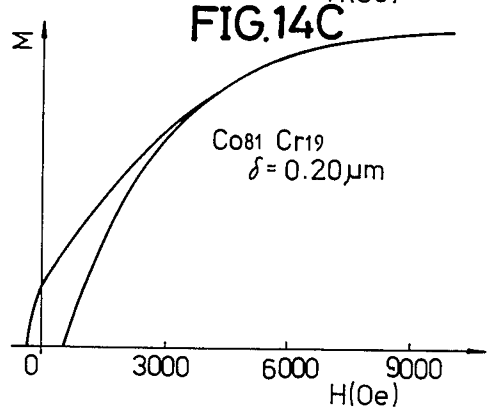

It can be seen that even in the case where the Nb is added to the Co-Cr as the third element, the coercivity Hc(⊥) which contributes to the perpendicular magnetization is large when the jump occurs as indicated by arrows C and D in FIGS. 12A and 12D, but the coercivity Hc(⊥) is small when the jump does not occur. Furthermore, when the jump occurs, the coercivity Hc(//) of the first crystal layer is under approximately 180 Oe, the coercivity Hc(⊥) of the second crystal layer is over approximately 200 Oe, the perpendicular anisotropic magnetic field Hk is small and the in-plane squareness ratio Mr(//)/Ms is large compared to that of the Co-Cr thin film having approximately the same film thickness. The in-plane squareness ratio Mr(//)/Ms gradually increases from a lower limit of 0.2 as the film thickness $\delta$ decreases. In other words, the jump occurs when the in-plane squareness ratio Mr(//)/Ms of the magnetic thin film as a whole is over 0.2. Such a characteristic was generally considered as being an unfavorable condition when the ring core head having the large magnetic flux distribution is used as the magnetic head. However, when the recording wavelength versus reproduced output characteristic of the perpendicular magnetic recording medium having the Co-Cr-Nb thin film shown in FIG. 13 is observed, it can be seen that the reproduced output obtained with the Co-Cr-Nb thin film in which the jump occurs is more satisfactory than the reproduced output obtained with the Co-Cr-Nb thin film in which no jump occurs, and the reproduced output is especially satisfactory in the region in which the recording wavelength is short. In the short wavelength region, that is, in the region in which the recording wavelength is in the range of 0.2 to 1.0 micron, the reproduced output increases for the Co-Cr thin film and also for the Co-Cr-Nb thin film in which no jump occurs. However, in the case of the Co-Cr-Nb thin film in which the jump occurs, the rate with which the reproduced output increases is larger than the rate with which the reproduced output increases in the case of the thin films having the film thicknesses described above. It can be seen that the Co-Cr-Nb thin film in which the jump occurs is especially suited for the perpendicular magnetization with the short recording wavelength. The reproduced output curve is a downwardly opening parabola in the short wavelength region, but in the case of the Co-Cr-Nb thin film in which the jump occurs, the reproduced output is larger than those obtained with the Co-Cr thin film and the Co-Cr-Nb thin film in which no jump occurs throughout the entire wavelength region.

Figure 15:
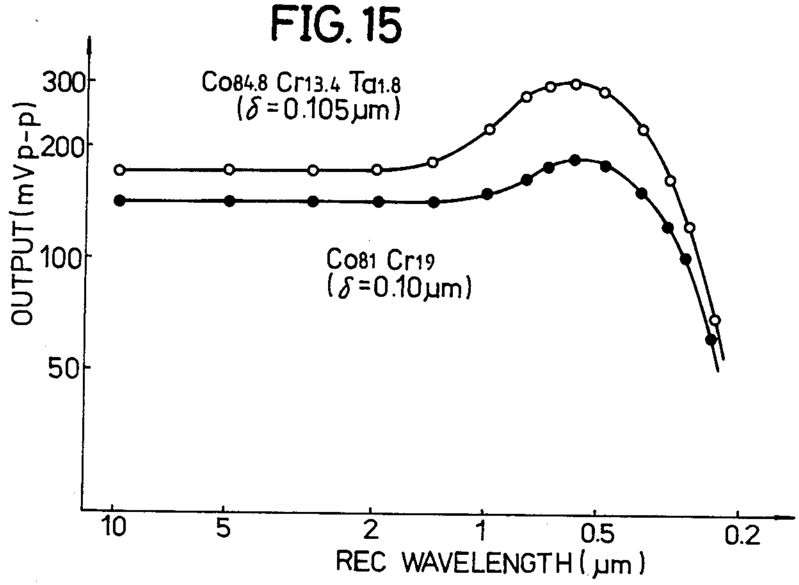
FIGS. 15 is a graph showing the relationship between the recording wavelength and the reproduced output when the perpendicular magnetic recording and reproduction are performed with respect to the Co-Cr-Nb thin film and the Co-Cr thin film.

Results similar to those obtained in the case of the Co-Cr-Nb thin film are obtained for the Co-Cr-Ta thin film. Table 2 shows various magnetic characteristics for the cases where the film thickness of the Co-Cr thin film and the Co-Cr-Ta thin film is varied. In Table 2, the same designations are used as in Table 1. FIGS. 14A through 14E are graphs respectively showing the in-plane M-H hysteresis loops of the thin films shown in Table 2. FIG. 15 shows the recording wavelength versus reproduced output characteristic of the perpendicular magnetic recording medium having the Co-Cr-Ta thin film.

TABLE 2

| Composition (at %) | $\delta$ (μm) | Ms (emu/cc) | Hc(⊥) (Oe) | Hc(//) (Oe) | $\Delta\theta 50$ (deg) | Mr(//)/Ms | Hk (Oe) |
|---|---|---|---|---|---|---|---|
| $Co_{84.8}Cr_{13.4}Ta_{1.8}$ | 0.105 | 406 | 770 | 114 | 11.5 | 0.46 | 750 |
| $Co_{81}Cr_{19}$ | 0.10 | 395 | 753 | 423 | 10.2 | 0.24 | 3420 |
| $Co_{81}Cr_{19}$ | 0.20 | 449 | 728 | 446 | 10.2 | 0.19 | 4350 |

As described heretofore, it can be regarded that the improvement in the reproduced output characteristic in the short wavelength region is due to the jump. The coercivity Hc(//) of the first crystal layer in the magnetic film in which the jump occurs is smaller than the coercivity Hc(//) of the first crystal layer in the magnetic film in which no jump occurs.

Next, description will be given with respect to the range of the coercivity ratio with which the jump occurs by referring to Table 3 and FIGS. 16 and 17, where the coercivity ratio is the ratio Hc(//)/Hc(⊥) between the coercivity Hc(//) of the first crystal layer and the coercivity Hc(⊥) of the second crystal layer. Table 3 shows comparison of the various magnetic characteristics of the Co-Cr-Nb thin films and the Co-Cr-Ta thin film in which the magnetization jump occurs and the various magnetic characteristics of the Co-Cr-Nb thin film and the Co-Cr thin film in which no jump occurs. In Table 3, the same designations used in Tables 1 and 2 are used. Furthermore, in Table 3, the roman numerals I through VI on the left of the table represent the six different cases and this designation is also used in FIGS. 16 and 17. The cases I through VI respectively represent the cases where the composition of the thin film is $Co_{84.8}Cr_{13.4}Ta_{1.8}$, $Co_{84.1}Cr_{13.2}Nb_{2.7}$, $Co_{83.3}Cr_{13.1}Nb_{3.6}$, $Co_{83.3}Cr_{13.1}Nb_{3.6}$, $Co_{85.3}Cr_{13.4}Nb_{1.3}$ and $Co_{81}Cr_{19}$ at%. In addition, the word "yes" under the column "Jump" indicates that the jump occurs, and the word "no" under the column "Jump" indicates that no jump occurs. The data for the cases II, V, and VI are the same as the data shown in Table 1.

TABLE 3

| Case | δ (μm) | Ms (emu/cc) | Hc(⊥) (Oe) | Hc(//) (Oe) | Δθ50 (deg) | Mr(//)/Ms | Hk (Oe) | Hc(//)/Hc(⊥) | Jump |
|---|---|---|---|---|---|---|---|---|---|
| I | 0.20 | 464 | 1275 | 231 | 8.4 | 0.23 | 4600 | 1/5.5 | yes |
| II | 0.19 | 448 | 893 | 177 | 8.7 | 0.24 | 3030 | 1/5 | yes |
| III | 0.19 | 331 | 624 | 56 | 9.2 | 0.37 | 720 | 1/11.1 | yes |
| IV | 0.19 | 334 | 759 | 36 | 6.0 | 0.26 | 450 | 1/21.1 | yes |
| V | 0.19 | 497 | 677 | 435 | 8.9 | 0.21 | 3900 | 1/1.6 | no |
| VI | 0.20 | 449 | 728 | 446 | 10.2 | 0.19 | 4350 | 1/1.6 | no |

Figure 16:
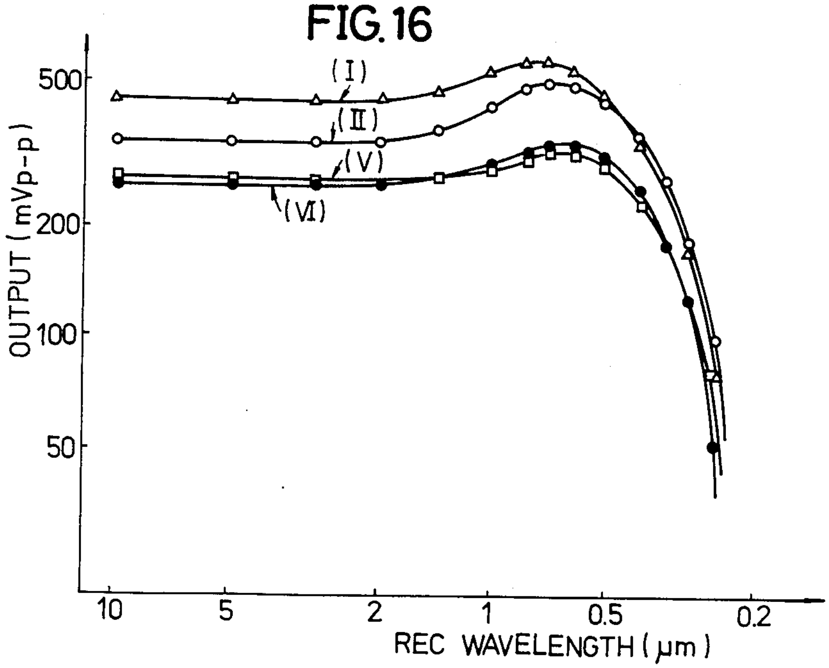
FIGS. 16 and 17 are graphs respectively showing the relationship between the recording wavelength and the reproduced output when the perpendicular magnetic recording and reproduction are performed with respect to the thin films shown in Table 3.
Figure 17:
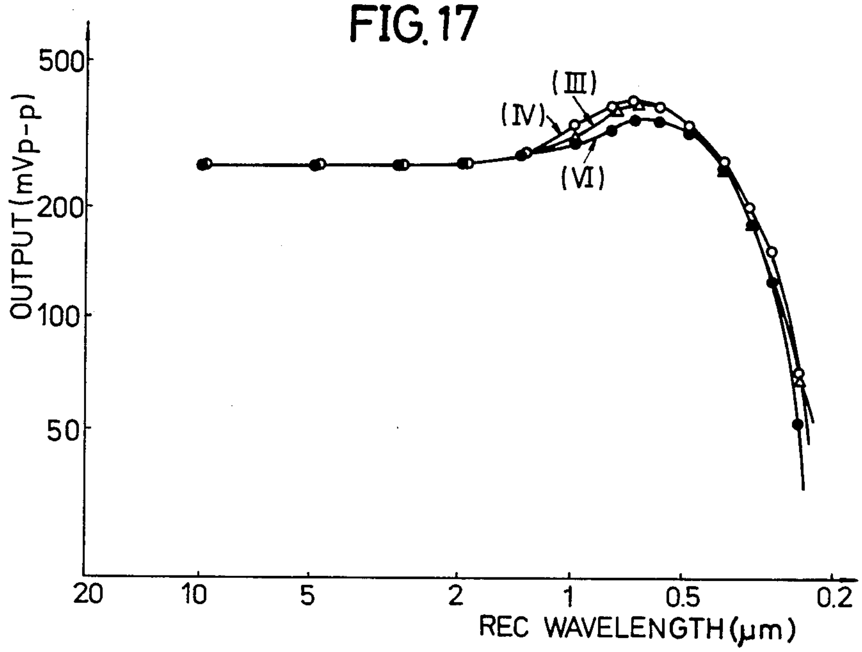

FIGS. 16 and 17 are graphs respectively showing the relationship between the recording wavelength and the reproduced output when the perpendicular magnetic recording and reproduction are performed with respect to the thin films shown in Table 3.

When the Nb or Ta is added to the Co-Cr as the third element as shown in Table 3, the coercivity Hc(⊥) which contributes to the perpendicular magnetization is large when the jump occurs, but the coercivity Hc(⊥) is small when the jump does not occur. When the recording wavelength versus reproduced output characteristics of the Co-Cr-Nb thin film and the Co-Cr-Ta thin film (hereinafter simply referred to as the Co-Cr-Nb(Ta) thin films) shown in FIGS. 16 and 17 are observed, it can be seen that the reproduced outputs obtained with the Co-Cr-Nb(Ta) thin films are more satisfactory than the reproduced outputs obtained with the Co-Cr-Nb(Ta) thin films in which no jump occurs and the Co-Cr thin film.

On the other hand, as shown in Table 3, the thin film in which the jump occurs has a coercivity ratio Hc(//)/Hc(⊥) of under 1/5. In addition, the thin film in which no jump occurs has a large coercivity ratio Hc(//)/Hc(⊥) in the order of 1.6. According to the experiments performed by the present inventors, it can be regarded that the upper limit of the coercivity ratio Hc(//)/Hc(⊥) with which the jump occurs is near 1/5. Generally, it can be considered that the coercivity Hc(⊥) of the perpendicular magnetization layer suited for the perpendicular magnetic recording and reproduction is up to approximately 1500 Oe, and the coercivity Hc(//) of the first crystal layer suited to function as the high permeability layer is in the order of 30 Oe in the average. Hence, it can be regarded that the lower limit of the coercivity ratio Hc(//)/Hc(⊥) is near 1/50. In other words, it is possible to realize a perpendicular magnetic recording medium having a satisfactory reproduced output especially in the short wavelength region by selecting the coercivity ratio Hc(//)/Hc(⊥) to a value greater than or equal to 1/50 and less than or equal to 1/5 when forming the magnetic layer so that the jump occurs. The value of the coercivity ratio Hc(//)/Hc(⊥) can be adjusted by changing the composition of the magnetic material and appropriately selecting the sputtering condition.

Figure 18:
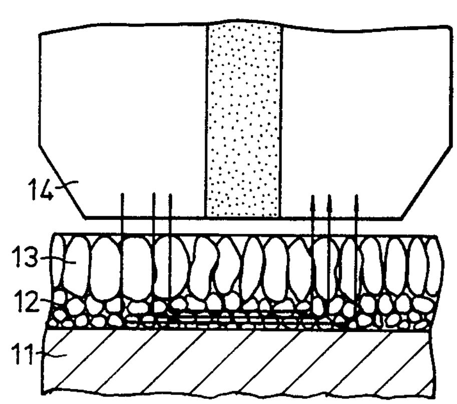
FIG. 18 is a diagram for explaining the pattern of the magnetic line of force within the perpendicular magnetic recording medium according to the present invention by the magnetic line of force from a magnetic head for the case where the thickness of the perpendicular magnetic recording medium is small.

Next, description will be given with respect to the reason why the reproduced output is improved when the jump occurs in the magnetic layer. When the magnetic layer is formed by sputtering the Co-Cr-Nb or Co-Cr-Ta, a first crystal layer 12 of fine grain having a small coercivity Hc(//) of under approximately 180 Oe is formed in the vicinity of a base 11, and a second crystal layer 13 of coarse grain having a large coercivity Hc(⊥) of over approximately 200 Oe is formed on the first crystal layer 12, as shown in FIG. 18. In other words, the magnetic layer is constituted by the first and second crystal layers 12 and 13. Since the coercivity ratio Hc(//)/Hc(⊥) between the coercivity Hc(//) of the first crystal layer 12 and the coercivity Hc(⊥) of the second crystal layer 13 is selected to a value greater than or equal to 1/50 and less than or equal to 1/5, the jump occurs in the magnetic layer which is constituted by the first and second crystal layers 12 and 13. For this reason, it can be regarded that the magnetic flux from a magnetic head 14 penetrates the second crystal layer 13, reaches the first crystal layer 12 and advances in the in-plane direction within the first crystal layer 12 having the small coercivity Hc(//) and large permeability, and the second crystal layer 13 is magnetized in the perpendicular direction by the magnetic flux which rapidly reaches the magnetic pole portion of the magnetic head 14. Hence, the pattern of the magnetic line of force from the magnetic head 14 describes a generally U-shape as indicated by arrows in FIG. 18. Because the magnetic flux sharply penetrates the second crystal layer 13 at a predetermined perpendicular magnetic recording position, the second crystal layer 13 is subjected to a perpendicular magnetization which causes a large remanent magnetization.

Giving attention to the coercivity Hc(//) of the first crystal layer 12 for the case where the jump occurs and for the case where no jump occurs, when the in-plane M-H hysteresis characteristic is such that the in-plane squareness ratio Mr(//)/Ms is over 0.2, the coercivity Hc(//) for the case where the jump occurs is smaller than the coercivity Hc(//) for the case where no jump occurs. It is desirable for the first crystal layer 12 to have a high permeability in order for the first crystal layer 12 to function as the high permeability layer described before. Hence, it can be regarded that a satisfactory reproduced output is obtainable with the magnetic layer such as the Co-Cr-Nb(Ta) thin films having an in-plane M-H hysteresis characteristic in which there is a sharp rise in the vicinity of the origin and the jump occurs. According to the experiments performed by the present inventors, a satisfactory reproduced output was obtainable when the coercivity Hc(//) of the first crystal layer 12 is under 180 Oe and the coercivity Hc(⊥) of the second crystal layer 13 is over 200 Oe, by taking into account the measuring error and the like.

Figure 19:
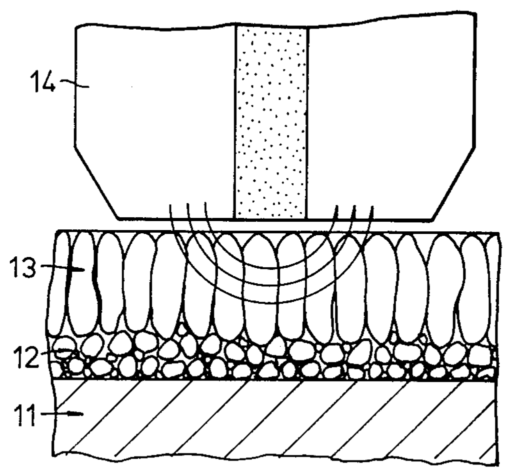
FIG. 19 is a diagram for explaining the pattern of the magnetic line of force within the perpendicular magnetic recording medium according to the present invention by the magnetic line of force from the magnetic head for the case where the thickness of the perpendicular magnetic recording medium is large.

On the other hand, giving attention to the film thickness of the Co-Cr-Nb(Ta) thin films, the thickness of the second crystal layer 13 increases when the film thickness of the thin film increases while the thickness of the first crystal layer 12 remains approximately constant. Hence, the distance between the magnetic head 14 and the first crystal layer 12 increases when the film thickness of the thin film increases. For this reason, when the film thickness of the thin film is large, the magnetic line of force from the magnetic head 14 does not reach the first crystal layer 12 and simply reaches the magnetic pole of the magnetic head 14 by passing through the second crystal layer 13 as shown in FIG. 19. Accordingly, the magnetization direction is dispersed and it is impossible to obtain a strong perpendicular magnetization.

As described heretofore, the lower limit of the film thickness of the magnetic layer as a whole with which the jump quantity $\sigma_j$ and the coercivity Hc(⊥) sharply rise, that is, the jump occurs, is in the range of 0.05 to 0.15 micron. On the other hand, the first crystal layer 12 has an extremely small thickness in the range of 0.05 to 0.15 micron, and the second crystal layer 13 can sufficiently function as the perpendicular magnetization layer when the thickness of the second crystal layer 13 is in the order of 0.2 micron. Therefore, the film thickness of the magnetic layer constituted by the first and second crystal layers 12 and 13 can be made extremely small, that is, under 0.3 micron.

When the film thickness of the Co-Cr-Nb(Ta) thin films is made small, the distance between the magnetic head 14 and the first crystal layer 12 becomes small. As a result, the magnetic line of force from the magnetic head positively reaches the first crystal layer 12 and advances therein, and the pattern of the magnetic line of force describes the general U-shape as described before in conjunction with FIG. 18. In other words, the magnetic flux which contributes to the perpendicular magnetization is extremely sharp in the perpendicular direction, and it is possible to perform a satisfactory perpendicular magnetic recording due to the large remanent magnetization. Hence, it is possible to perform a more satisfactory perpendicular magnetic recording when the film thickness of the Co-Cr-Nb(Ta) thin films is small, and the thickness of the recording medium can therefore be made small to ensure the desired flexibility of the recording medium so as to maintain a satisfactory state of contact between the magnetic head and the recording medium. According to the experiments performed by the present inventors, it is possible to obtain a satisfactory reproduced output even when the film thickness of the thin film is in the range of 0.1 to 0.3 micron.

Figure 20:
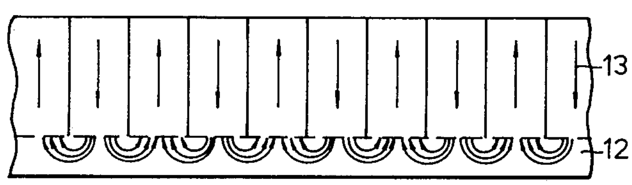
FIG. 20 is a diagram for explaining that a lower part of the remanent magnetic field formed in a second crystal layer of coarse grain is communicated through a first crystal layer of fine grain.

Since the coercivity Hc(//) of the first crystal layer 12 is not zero but is in the order of 180 Oe, it is possible to magnetize the first crystal layer 12 to an extent corresponding to this small coercivity Hc(//). When the perpendicular magnetization is performed, a plurality of magnets having reversed magnetization direction in correspondence with a predetermined bit interval are alternately formed in the second crystal layer 13 as shown in FIG. 20. On the other hand, a magnetic flux linking the lower ends of mutually adjacent magnets is formed in the first crystal layer 12 as indicated by arrows in FIG. 20. Hence, there is no demagnetization phenomenon between the mutually adjacent magnets in the second crystal layer 13, and this phenomenon is especially notable when the density between the mutually adjacent magnets is high. In other words, this phenomenon is especially notable when the recording wavelength is small, and for this reason, it is possible to considerably improve the reproduced output in the short wavelength region. In addition, the Co-Cr-Nb(Ta) thin films respectively constituted by the high coercivity layer and the low coercivity layer are formed by a continuous sputtering process. Hence, it is unnecessary to change the sputtering condition nor change the target in order to form the two layers which constitute the thin film. As a result, the processes of forming the Co-Cr-Nb(Ta) thin films are simplified, the sputtering time can be reduced and it is possible to manufacture the perpendicular magnetic recording medium at a low cost and with a high productivity. Furthermore, because the coercivity ratio Hc(//)/Hc(⊥) is selected to a value greater than or equal to 1/50 and less than or equal to 1/5 and the coercivity Hc(//) of the first crystal layer 12 is not considerably small compared to the coercivity Hc(⊥) of the second crystal layer 13, the Barkhausen noise will not be generated and it is possible to perform satisfactory perpendicular magnetic recording and reproduction.

Next, description will be given with respect to embodiments of the methods of manufacturing the perpendicular magnetic recording medium having the superior characteristics described heretofore. But first, description will be given with respect to an example of a conventional method of manufacturing the perpendicular magnetic recording medium having the double film construction. The perpendicular magnetic recording medium manufactured by this conventional method comprises a base, a high permeability film (for example, a Ni-Fe film) formed on the base and a Co-Cr film formed on the Ni-Fe film.

Figure 21:
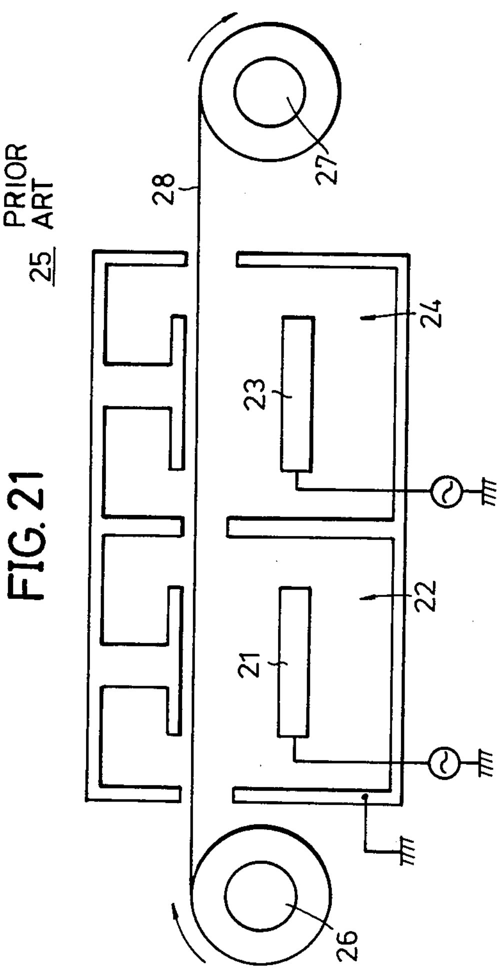
FIG. 21 generally shows an example of a sputtering apparatus which is used in a conventional method of manufacturing a perpendicular magnetic recording medium comprising a Co-Cr film and a high permeability film.

As shown in FIG. 21, a sputtering apparatus 25 generally comprises a chamber 22 having a Ni-Fe alloy as a target 21, a chamber 24 having a Co-Cr alloy as a target 23 and supply and take-up reels 32 and 33. The Ni-Fe film is sputtered within the chamber 22 on a base film 28 which is paid out from the supply reel 26 and is taken up on the take-up reel 27. Thereafter, the Co-Cr film is sputtered within the chamber 24 on the Ni-Fe film which is formed on the base film 28. As a result, the perpendicular magnetic recording medium having the double film construction, that is, the perpendicular magnetic recording medium in which the magnetic layer is constituted by the two independently formed films, is produced.

However, according to the conventional method, an amorphous Ni-Fe alloy or the like is sputtered on the base film 28 under a predetermined sputtering condition suited for forming the high permeability film, and the Co-Cr alloy is sputtered on the Ni-Fe film which is on the base film 28 under another predetermined sputtering condition suited for forming the Co-Cr film. Hence, in order to produce the perpendicular magnetic recording medium, the sputtering condition and the target must be changed every time each film is formed on the base film 28. Accordingly, the conventional method is disadvantageous in that it is impossible to perform a continuous sputtering, the processes are complex and the productivity is poor.

Figure 22:
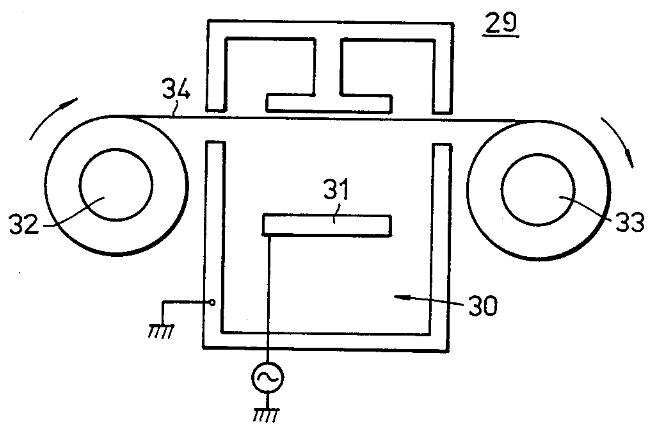
FIGS. 22 and 23 generally show sputtering apparatuses which are used in first and second embodiments of the method of manufacturing the perpendicular magnetic recording medium according to the present invention, respectively.

A sputtering apparatus 29 shown in FIG. 22 is used in the first embodiment of the method of manufacturing the perpendicular magnetic recording medium according to the present invention. The sputtering apparatus 29 generally comprises a single chamber 30 having a single target 31 and supply and take-up reels 32 and 33. The chamber 30 is communicated with a vacuum discharge system (not shown) and is designed so that the degree of vaccum within the chamber 30 can be adjusted. A Co-Cr-Nb or Co-Cr-Ta alloy having a predetermined composition is used as the target 31. A base film 34 is paid out from the supply reel 32, sputtered with the Co-Cr-Nb or Co-Cr-Ta alloy so that a Co-Cr-Nb or Co-Cr-Ta thin film is formed on the based film 34 and is taken up on the take-up reel 33. When the Co-Cr-Nb or Co-Cr-Ta alloy is sputtered on the base film 34, the first crystal layer of fine grain is initially formed on the base film 34 until the film thickness reaches a predetermined value and the second crystal layer of coarse grain is continuously formed on the first crystal layer. In other words, the magnetic film which is constituted by the first and second crystal layers having the same composition but having different grain size is formed on the base film 34 without the need to change the target nor change the sputtering condition. The magnetic film constituted by the first and second crystal layers is formed in one sputtering process, and the first and second crystal layers are formed under the same sputtering condition.

Figure 23:
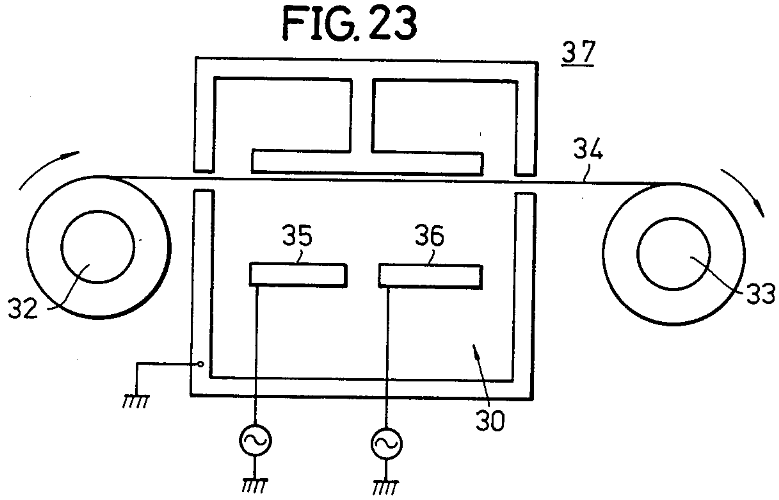

A sputtering apparatus 37 shown in FIG. 23 is used in the second embodiment of the method of manufacturing the perpendicular magnetic recording medium according to the present invention. In FIG. 23, those parts which are the same as those corresponding parts in FIG. 22 are designated by the same reference numerals, and description thereof will be omitted. The chamber 30 of the sputtering apparatus 37 has a plurality of targets 35 and 36. For example, a Co-Cr alloy is used as the target 35 and a third element Nb (or Ta) is used as the target 36. In this case, the Co-Cr and Nb (or Ta) are mixed before reaching the base film 34 and a Co-Cr-Nb (or Co-Cr-Ta) thin film is formed on the base film 34 by the sputtering. Accordingly, it is possible to independently handle the Co-Cr alloy which is used in large quantities and the third element which is only used in small quantities, and the composition of the magnetic film can be changed by independently controlling the targets 35 and 36. Therefore, it is possible to simplify the processes of forming the magnetic film, reduce the sputtering time and manufacture the perpendicular magnetic recording medium at a low cost and with a high productivity.

In the first and second embodiments described above, the sputtering apparatuses 29 and 37 are used to form the magnetic film on the base film by the sputtering process. However, the method of forming the magnetic film on the base film is not limited to the above, and for example, it is also possible to employ other methods of forming the thin film such as the vacuum deposition technique and the chemical vapor deposition technique.

Further, the present invention is not limited to these embodiments, but various variations and modifications may be made without departing from the scope of the present invention.

What is claimed is:

1. A perpendicular magnetic recording medium on which a signal is recorded and from which the signal is reproduced by a magnetic head, said perpendicular magnetic recording medium comprising:

a recording medium base; and a magnetic layer comprising a low coercivity layer and a high coercivity layer, said magnetic layer as a whole having a thickness of under 0.3 micron, said low coercivity layer having a thickness in a range of 0.05 to 0.15 micron, said low coercivity layer being formed on said recording medium base and having a low coercivity in an in-plane direction thereof, said high coercivity layer being formed on said low coercivity layer and having a high coercivity in a direction perpendicular to a surface of said low coercivity layer, said low coercivity layer and said high coercivity layer being formed from the same magnetic material which is a magnetic material including cobalt-chromium added with at least one of niobium and tantalum, said magnetic layer having an in-plane M-H hysteresis characteristic described by an in-plane-M-H hysteresis loop which has a sharp rise in the vicinity of the origin.

2. A perpendicular magnetic recording medium as claimed in claim 1 in which said low coercivity layer has an in-plane coercivity of under 180 Oe, and said high coercivity layer has a perpendicular coercivity of over 200 Oe.

3. A perpendicular magnetic recording medium as claimed in claim 1 in which said low coercivity layer comprises a first crystal layer of fine grain, and said high coercivity layer comprises a second crystal layer of coarse grain.

4. A perpendicular magnetic recording medium as claimed in claim 1 in which said magnetic layer has an in-plane M-H hysteresis characteristic described by an in-plane M-H hysteresis loop wherein an in-plane squareness ratio is over 0.2.

5. A perpendicular magnetic recording medium as claimed in claim 1 in which said magnetic layer has a perpendicular anisotropic magnetic field of under 4000 Oe.

6. A perpendicular magnetic recording medium as claimed in claim 1 in which a coercivity ratio $Hc(//)/Hc(\perp)$ between an in-plane coercivity $Hc(//)$ of said low coercivity layer and a perpendicular coercivity $Hc(\perp)$ of said high coercivity layer is greater than or equal to 1/50 and is less than or equal to 1/5.

* * * * *